United States Patent Office.

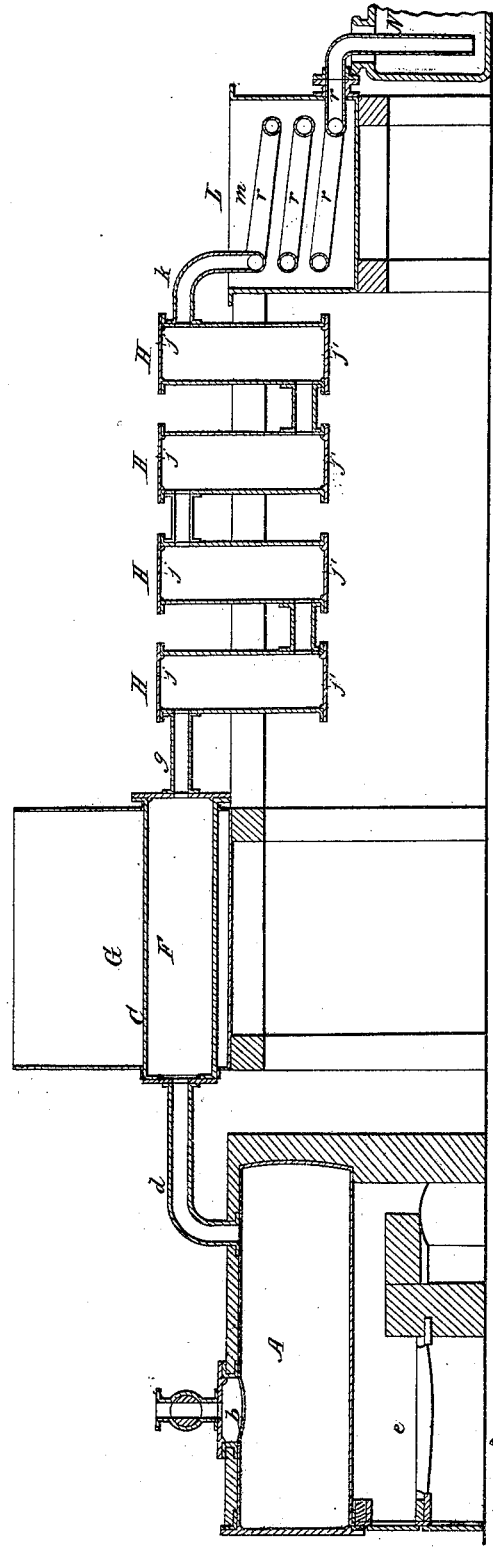

ALFRED PARAF, OF THANN, FRANCE.

*Letters Patent No. 67,447, dated August 6, 1867.*

IMPROVEMENT IN THE MANUFACTURE OF AMMONIA.

*The Schedule referred to in these Letters Patent and making part of the same.*

TO ALL WHOM IT MAY CONCERN:

Be it known that I, ALFRED PARAF, of Thann, in the Empire of France, have invented a new and useful Process of Manufacturing Ammonia, and that the following is a full, clear, and exact description of the same.

It has long been known that large quantities of ammonia are produced in the manufacture of illuminating gas, and are found in the ammonia water, or ammoniacal liquor, as it is sometime called; but hitherto this product has generally been permitted to run to waste for the want of some economical process by means of which the ammonia in it could be separated in a pure form, or free from other matters.

The object of the invention which constitutes the subject of the present patent is to obtain pure ammonia from such ammoniacal liquor and other sources, and it consists of the process of distilling the same and passing the product through charcoal, which I have found absorbs the foul matters which are carried off in vapor in the operation of distillation, and leaves the ammonia in a practically pure form, so that it may be either used alone or combined with acids to form ammoniacal salts.

In order that my invention may be fully understood, I will proceed to describe the mode in which I have practised it with success, and the apparatus I have employed with advantage for the purpose, leaving it to users of my invention to modify either the mode or the apparatus, as circumstances may render expedient.

The apparatus is represented in vertical section in the accompanying drawing. It is composed mainly of a still, a cooler, a charcoal purifier, a second cooler or condenser, and a recipient for the ammonia, which are connected by pipes. The still which I have used is a cylindrical iron boiler, A, fitted with a man-hole, $b$, with stop-cocks to admit and discharge the liquor, and with a pipe, $d$, to conduct the products of distillation to the cooler, C. This still is set in brick-work, over a furnace, $e$. The cooler consists simply of a cast-iron vessel, F, immersed in cistern G, which is fed with cold water from a stop-cock connected with a water pipe; the water heated by the ammoniacal vapors being permitted to flow off. The cooling-vessel F is connected at one end with the still by a pipe, $d$, and is connected at its other end with the purifier by a second pipe, $g$. The purifier consists of several cylindrical cast-iron vessels, H, fitted at each end with bonnets $j\,j'$, so that the charcoal can be readily charged into them or removed. The purifying-vessels are connected by pipes, alternately at their upper and lower ends, so that the ammoniacal vapor is forced to traverse the series before escaping. The last purifying-vessel of the series is connected by a pipe, $k$, with the second cooler L, which, for distinction, may be designated the condenser, and which is composed of an iron coil, $r$, placed in a cistern, $m$, that is fed with cold water, the heated water being permitted to flow off. The lower end of the coil $r$ communicates with the recipient N, which may be an earthenware or iron vessel. The capacity of the still that I have used is about one hundred and twenty gallons, and the purifying-vessels are about nine inches in diameter and thirty-six inches high. I have sometimes arranged them in two gangs of three each, arranged side by side, and connected with the cooler by a pipe having two branches, so that the vapor from the cooler F is divided into two parts, each part traversing three purifying-vessels.

In operating with this apparatus the purifying-vessels are filled with wood charcoal in fragments, and the recipient is partially filled with water, so that the ammoniacal gas may be absorbed by it. About one hundred pounds of caustic lime, slaked as dryly as possible, (by water,) are placed in the still, and about sixty gallons of the ammoniacal liquor are admitted into the still. The still is closed, except the pipe leading to the cooler, the cisterns of the cooler and condenser are filled with water, and a fire is lighted in the furnace. The heat causes ammoniacal vapors to pass off from the liquor in the still. These vapors flow through the cooler F into the purifier, and through the latter and condenser L into the water in the recipient N. In the passage of the vapors through the charcoal, the foul matters contained in them are absorbed by the charcoal, and the ammoniacal gas thus purified is absorbed by the water in the recipient. When the liquor in the still is exhausted of ammonia, the still is cleaned out and is charged afresh. The charcoal in the purifiers will purify the ammonia of a number of charges, but it is expedient to discharge it from the purifier, and charge it afresh, as the ammoniacal vapor is apt to take a particular line of travel through the charcoal. When the charcoal becomes charged with the foul matters, its power may be restored by reburning it. The water in the recipient may be retained there until it becomes charged with ammonia to the required degree of strength. If the ammonia is to be converted into an ammoniacal salt, the requisite acid may be placed in the recipient and be retained there until it is saturated with ammonia.

Having thus described the best mode and apparatus which I have thus far devised for practising my invention, I declare that I do not restrict it to the use of the ammoniacal liquor of gas-works as the ammoniacal stock or source of ammonia, but intend to apply the same process to such other sources of ammonia as it may be expedient to treat by it. What I claim as my invention, and desire to secure by Letters Patent, is—

The process of preparing purified ammonia from ammoniacal stock by distillation, and treating the products by charcoal, substantially as hereinbefore set forth.

In testimony whereof I have hereunto set my hand this third day of December, A. D. 1866.

ALFRED PARAF.

Witnesses:
GEO. H. COLLINS,
E. S. RENWICK.